United States Patent [19]

Welton, Jr.

[11] 3,941,576
[45] Mar. 2, 1976

[54] METHOD AND APPARATUS FOR MAKING MOLTEN GLASS WITH BATCH GUIDING MEANS

[75] Inventor: Wright M. Welton, Jr., Paw Paw, W. Va.

[73] Assignee: PPG Industries, Inc., Pittsburgh, Pa.

[22] Filed: Nov. 29, 1974

[21] Appl. No.: 528,374

[52] U.S. Cl. .................. 65/135; 65/335; 65/347
[51] Int. Cl.² ........................................ C03B 5/16
[58] Field of Search ............ 55/134, 135, 136, 335, 55/337, 346, 347

[56] References Cited
UNITED STATES PATENTS

| | | | |
|---|---|---|---|
| 2,397,852 | 4/1946 | Gentil | 65/335 |
| 2,780,891 | 2/1957 | Arbeit | 65/335 |
| 3,495,966 | 2/1970 | West | 65/335 |

*Primary Examiner*—Arthur D. Kellogg
*Attorney, Agent, or Firm*—Dennis G. Millman

[57] ABSTRACT

In a continuous glass melting furnace, a pair of substantially horizontally and longitudinally extending barrier rods are provided just beneath the surface of the molten glass closely adjacent to the sides of the floating batch blanket so as to maintain the batch blanket spaced from the sidewalls of the furnace.

13 Claims, 3 Drawing Figures

U.S. Patent  March 2, 1976  3,941,576
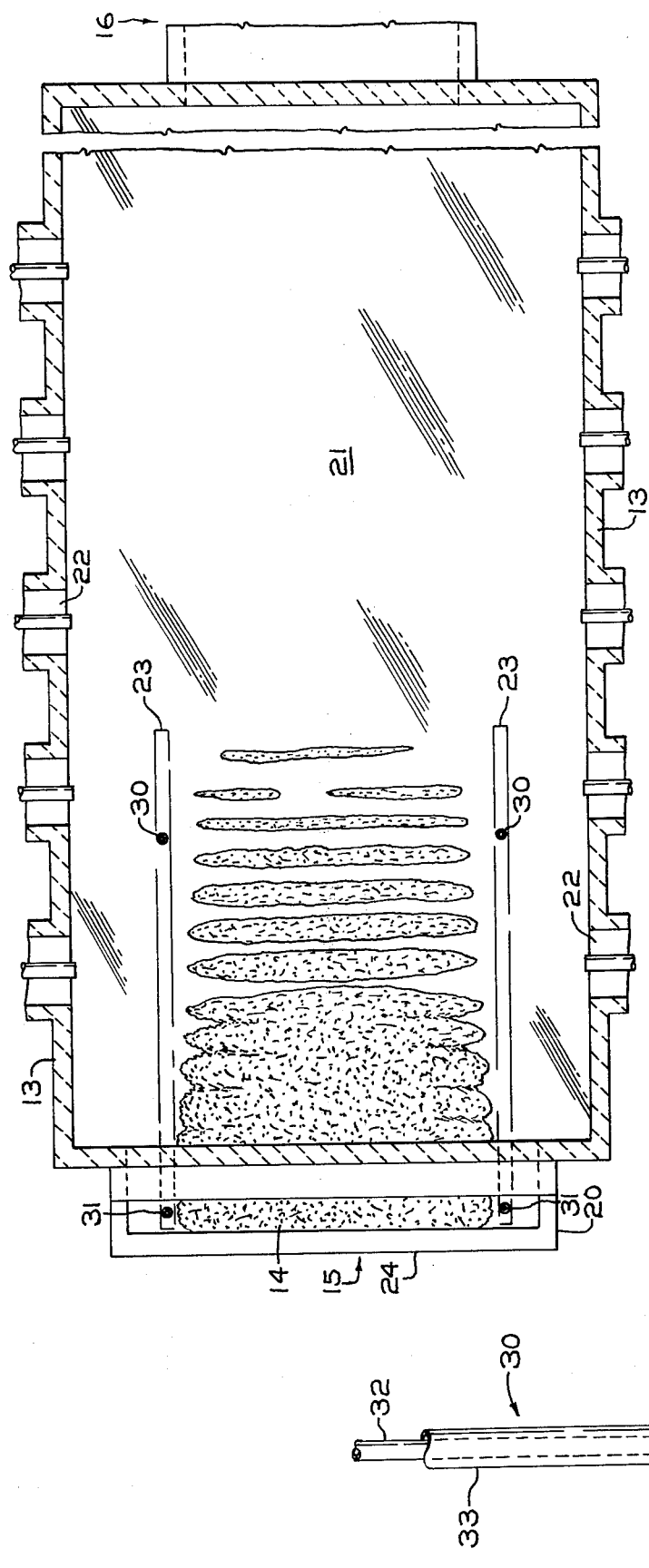
Fig.2
Fig.1
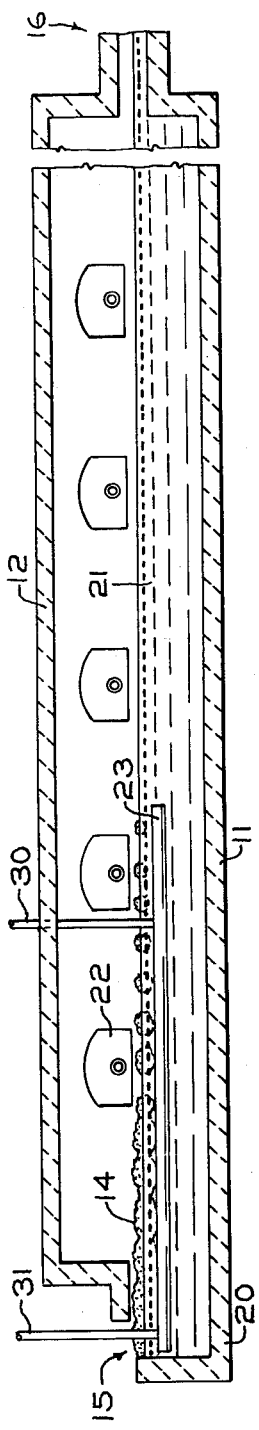
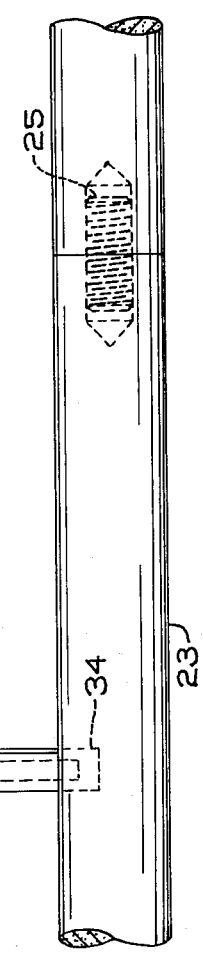
Fig.3

METHOD AND APPARATUS FOR MAKING MOLTEN GLASS WITH BATCH GUIDING MEANS

BACKGROUND OF THE INVENTION

This invention relates to the melting furnace of a glassmaking operation, and in particular to a method and apparatus in which guidance means are employed to impart directional stability to the unmelted mass of glass batch material that floats on the surface of the molten glass in the furnace.

The conventional continuous glass melting furnace is provided with an inlet and an outlet at opposite ends, raw, pulverulent batch material being introduced through the inlet, and molten glass being drawn off at the outlet. Heat for melting is typically provided by flames directed above and across the glass. The batch material is deposited onto the surface of the pool of molten glass contained by the furnace and, as it is carried downstream by the general progression of molten glass toward the outlet, forms a layer on the surface known as the "blanket." The batch blanket may extend along the length of the furnace a substantial distance before it begins to break up into discrete agglomerations of batch known as "floaters." In this type of operation, the downstream end of the batch blanket often tends to drift laterally into contact with one of the sidewalls of the furnace, which leads to a number of severely detrimental side effects.

One ensuing problem arises from the fact that the unmelted or partially melted batch material is highly corrosive to the refractory materials from which the furnace walls are made, so that contact between the batch blanket and a sidewall promotes erosion of the sidewall. This erosion is detrimental not only because furnace life is shortened, but also because it causes greater numbers of particles from the walls to enter the molten glass, which, because they are of a different composition and difficult to melt, appear in the final product as inhomogeneities or defects known as "stones."

Another detrimental side effect of the batch blanket drifting against a sidewall is that thermal conditions in the furnace are made unsymmetrical, which in turn leads to the formation of "hot spots" in the molten glass and sets up uneven circulation patterns. The heat input of this type of furnace is usually concentrated at the longitudinal centerline of the furnace where the unmelted batch is normally centered. Thus when the batch blanket shifts to the side, a region of uncovered molten glass at the center can become exposed to extremely high temperatures and become over-heated, forming a hot spot. Because of the high rate of heating, the hot spot exhibits violent, thermally induced convection currents in that region of the glass which can cause contaminants to be stirred up from the bottom and sides of the pool of molten glass, can increase erosion of the sidewall opposite that against which the batch blanket has drifted, and can cause even more batch material to build up against one sidewall. Furthermore, since a substantial portion of the unmelted batch is in the cooler sidewall region when the blanket has drifted and thermal energy is being wasted in overheating some of the molten glass, the batch materials melt more slowly and less thoroughly and the accumulation of unmelted batch along the sidewall against which it has drifted may grow longer and longer, eventually reaching a point where proper melting has not been achieved in glass arriving at the outlet. The net result of batch blanket drift is a serious deterioration in the quality of glass produced and/or a severe reduction in throughput.

Various mechanical pushing or scraping means have been employed in the past for keeping the batch blanket centered in the melting furnace, but these have been found to be not fully satisfactory because their operation is inefficient and their intermittent action does not assure a uniform quality of glass. An example of a pushing device may be seen in U.S. Pat. No. 3,294,506. A more recent proposal is shown in U.S. Pat. No. 3,495,966, wherein cooling means are deployed in the center of the batch blanket to produce currents in the glass that tends to maintain the batch centered in the furnace. That approach, however, requires the use of specially modified batch feeding means and increases operating costs in that it reduces furnace efficiency by removing a large amount of thermal energy from the furnace.

U.S. Pat. No. 2,780,891 discloses the use of submerged obstacles in glass melting furnaces for impeding the movement of floating masses of batch material so as to shorten the melting zone. However, the obstacles are designed to stop both lateral and longitudinal movement of a lump of batch, and are not adaptable to guiding a continuous batch blanket away from the sidewalls as it progresses along the length of a furnace.

A pair of short baffles that engage the sides of a batch blanket are shown in U.S. Pat. No. 3,204,787. These baffles are mounted above the glass line at the ends of water-cooled metal pipes which extend through the inlet opening. The strength limitations of such an arrangement permit the use of only short baffles and restricts their location to the region of the inlet opening. Such baffles serve primarily to prevent batch from accumulating in the corners, and although they may effect some minor lateral restraint of the upstream portion of the blanket, the more unstable downstream portion is left completely free to drift against the sidewalls.

It is also well known to insert electrodes through the walls of glass melting furnaces into the molten glass for the purpose of generating supplemental heat. The modified use of such electrodes as batch blanket guide means forms part of the disclosure of the related U.S. Pat. Application Ser. No. 528,373 of Ronald L. Schwenninger filed on even date herewith, assigned to the assignee of the present application, PPG Industries, Inc., and entitled "Method and Apparatus for Making Molten Glass." Employing electrodes as guide means, however, entails drilling holes in the furnace wall below the glass line so that exterior electrical connections can be made to the electrodes. But in furnaces where supplemental heating is not desired, such an arrangement presents an unnecessary path for wasteful heat loss from the furnace and a potential site for erosion and leakage.

Thus there is a need for means to impart more effective lateral guidance to a continuous batch blanket that does not reduce furnace efficiency or entail the other drawbacks of prior art arrangements.

SUMMARY OF THE INVENTION

In accordance with the present invention, a batch blanket is maintained evenly spaced from the sidewalls of a glass melting furnace by providing within the furnace a pair of longitudinally extending barriers that are supported along the sides of the batch blanket just beneath the molten glass level. The barriers may be comprised of rod-like or bar-like members of refractory material that are supported from the roof, sides, or bottom of the furnace so as to leave undisturbed the normal circulation of molten glass under and around the batch blanket. In the preferred embodiment the barriers consist of carbon rods held in place by water-cooled pipes extending through the furnace roof. The barriers have sufficient length to impart a "steering" effect to the batch blanket, preferably extending from near the inlet end wall to at least the region where the batch begins to break up.

A more thorough understanding of the invention will be gained from the following detailed description of the preferred embodiments taken together with the drawings.

BRIEF DESCRIPTION OF THE DRAWINGS

FIG. 1 is a vertical section along the length of a typical glass melting furnace incorporating a preferred embodiment of the present invention.

FIG. 2 is a horizontal section through the same furnace shown in FIG. 1.

FIG. 3 is an elevation showing details of a segment of a barrier rod and one hold-down pipe.

DETAILED DESCRIPTION

This description refers specifically to the type of furnace conventionally employed in the manufacture of quality flat glass, but it should be apparent that the advantages of the invention render its inclusion in virtually any continuous glassmaking operation desirable.

Referring to FIGS. 1 and 2, there is shown in vertical and horizontal cross-sectional views, respectively, a conventional, continuously fed, cross-tank fired, glass melting furnace having an enclosure formed by a bottom 11, roof 12, and sidewalls 13 made of refractory materials. Glass batch material 14 is introduced through inlet opening 15 in an extension 20 of the furnace known as the fill doghouse. The batch may be introduced intermittently by feeding means (not shown) to form a ridged blanket floating on the surface of the molten glass 21 as shown, or it may be fed continuously to form a uniform blanket. Usually the most effective practice is to feed the batch across approximately the central two-thirds of the furnace width so as to concentrate the unmelted batch in the hottest regions of the furnace and to initially space the batch from the sidewalls. With the extra protection of the sidewalls provided in this invention, the blanket may, in some cases, be located closer to the sidewalls if thermal conditions permit. Overall progression of the glass is from left to right in the figures, toward a longitudinally displaced outlet opening 16 at the opposite end of the furnace from the inlet opening. Heat is provided by flames issuing from burner ports 22 spaced along the sidewalls, which are directed onto and across the molten glass.

The batch guiding barriers depicted in the figures are a preferred embodiment comprised of a pair of rods 23 that extend longitudinally and substantially horizontally along the sides of the batch blanket, suspended just beneath the surface of the molten glass. The rods may extend from inside the doghouse end wall 24 at an elevation lower than the inlet opening, through the fill doghouse extension, and into the main body of the furnace enclosure a distance sufficient to impart lateral guidance to the batch blanket. Rods 23 may consist of any material which is rigid at furnace temperatures and does not introduce a substantial amount of contamination into the molten glass by way of erosion. Many ceramic refractory materials known in the glassmaking art may be found suitable, depending upon the amount of contamination that can be tolerated. One material that may be employed without contaminating the glass composition is fused silica. it is also possible to utilize water-cooled metal pipes of high-temperature-resistant alloys without substantially lowering the surrounding glass temperature, provided that adequate support is given to such pipes to prevent sagging, if necessary. The material preferred for use as the barrier rods is carbon, because carbon is inexpensive, retains its rigidity at extremely high temperatures, is not a contaminant to glass, and has a specific gravity less than that of molten glass and therefore advantageously floats in the pool of molten glass. Suitable rods of carbon (usually comprised of a significant amount of graphite) are readily available commercially for use as industrial electrodes. These rods typically have diameters of several inches and are supplied in sections several feet long threaded on the ends to permit any number of sections to be connected with threaded pins 25 as shown in FIG. 3. These carbon rods are usually available with circular cross-sections, but any cross-sectional shape would generally be suitable.

Means for retaining the barriers in place may include support members extending from the bottom, roof, or sides of the furnace and may include pillars of refractory ceramics or water-cooled metal pipes. Carbon rods may also be used as support members if they are located below the molten glass level. Preferably only two narrow supports are provided for each barrier rod so as to not disrupt the circulation of molten glass or obstruct the burner flames. In connection with the preferred embodiment, supporting the carbon rods consists of holding each beneath the surface of the molten glass with a pair of water cooled pipes 30 and 31, which may be made of high-temperature-resistant alloys, including some stainless steel alloys. Each pipe has an inner tube 32 and an outer sheath 33 (FIG. 3) to provide concentric, countercurrent paths for the cooling water. Each hold-down pipe is received in a radial bore 34 in the carbon rods 23 in a slip-fit relationship.

The carbon rods may be installed by inserting them through the inlet opening 15 and floating them into position so as to align each bore 34 with its respective hold-down pipe. Hydraulically or pneumatically reciprocated pusher devices aid the aligning of the rods. The pipes may then be lowered to push the carbon rods beneath the surface of the molten glass to prevent them from being oxidized in the gaseous atmosphere of the furnace. The installation steps should be carried out with reasonable haste (e.g., about 30 minutes for each rod) to avoid substantial oxidation of the rods before they are submerged. The rods are preferably submerged in the molten glass at a minimal depth sufficient to just cover the electrodes. This might be on the order of about one to two inches (2.5 to 5 centimeters) in a large scale commercial furnace. Because the batch sinks several inches beneath the surface of the molten glass, the submerged barrier rods engage the lower portions of the batch and thus physically block lateral drifting of the batch. The maximum depth to which the rods may be submerged is therefore limited to the deepest level of the batch material. It is preferred that the rods be mounted as nearly horizontally as possible, but since the thickness of the batch blanket is reduced as melting progresses, the rods could slope upward slightly to follow the general contour of the underside of the batch blanket. Such a slop would normally be so moderate that it could be said that the barrier rods are for all practical purposes substantially horizontal.

The barrier rods should have relatively high structural strength so as to minimize the number of support members required. In a large scale commercial furnace, the preferred carbon rods may have diameters on the order of 4 to 9 inches (10 to 22.5 centimeters) in order to bridge spans as much as 20 feet (6 meters) or more. Even longer barrier spans are comtemplated, however, and can be readily accommodated by utilizing rods with appropriately larger diameters, carbon rods as large as 24 inches (62 centimeters) in diameter being commercially available. Even when not necessary for structural strength, some advantage may be derived from the use of large diameter barrier rods in that they present a larger obstacle in the path of drifting masses of batch.

The upstream ends of barrier rods 23 may be in contact with the interior surface of wall 24 or may even be set into sockets drilled partially through the wall from the inside, thereby eliminating the need for the upstream hold-down pipes 31. It may be desirable in most cases to space the ends of the barrier rods at least a small distance from the end wall 24 to avoid having the rods frozen into glass which sometimes solidifies near the relatively cool end wall, which could render removal of the rods more difficult in the event that the rods need to be replaced. A gap on the order of about 6 inches (15 centimeters) or less may be adequate to prevent lodging of the rods in frozen glass, but the ends of the rods may be located considerably farther downstream without impairing their guiding effect on the batch blanket. Since the batch blanket acts as a relatively cohesive unit, the barriers may coincide with only a portion of a length of the batch blanket, preferably toward the downstream end of the batch blanket, that being the portion most prone to lateral drifting. In general, the barriers should extend alongside at least 30 percent of the length of the batch blanket in order to obtain adequate guidance. Batch blanket length is measured from the point of batch introduction (from doghouse end wall 24 in FIGS. 1 and 2) to the zone where the blanket begins separating into discrete, freely floating agglomerations of batch known as "logs" or "floaters." The upstream ends of the barriers may thus be spaced several feed downstream from the inlet opening, and may be completely outside of the fill doghouse extension.

The optimum location of the downstream terminus of each barrier varies from furnace to furnace, being determined largely by the distance that the batch blanket extends into the furnace, which in turn depends upon the size and geometry of the furnace as well as various process parameters such as glass composition and furnace temperature. Although the barriers preferably extend downstream at least as far as the end of the batch blanket, the barriers may terminate somewhat short of that point since sufficient guidance of the batch may be effected by "steering" the blanket along a sufficiently long (i.e., at least 30%) upstream portion of its length so as to render it unlikely that the portion of the blanket beyond the barriers would drift into contact with the sidewalls of the furnace under normal circumstances. Additional safeguards may be provided by extending the barriers to the point where melting is substantially complete, i.e., where the "logs" or "floaters" disappear, or, in order to provide maximum protection, the barriers may extend the full length of the furnace.

The melting pattern depicted in FIGS. 1 and 2 may be considered to represent the fastest melting rate that would ordinarily be encountered in such a furnace in the flat glass industry. Such furnaces conventionally have about six to eight burner ports 22 on each side, only the first five being shown in FIGS. 1 and 2. With the primary source of heat for melting thus spaced along the length of the furnace, the most effective melting temperature would not be encountered until the batch has passed a number of the burner ports at the inlet end. Typically the batch blanket does not begin to break up until it approaches the region opposite the third or fourth burner port, nearly half the length of the furnace, but blankets reaching only the second burner port or as far as the fifth burner port are not exceptional. Although theoretically possible, it would require extreme furnace conditions for the batch blanket to begin breaking up opposite the first of a series of burner ports as shown in FIGS. 1 and 2. Thus, in terms of furnace structure, it can be generally said that the downstream ends of the barriers should be no closer to the inlet end than the region opposite the first burner port.

In a furnace of the type shown in FIGS. 1 and 2, which includes a fill doghouse extension 20, typical furnace geometry is such that the horizontal depth of the doghouse normally represents a small fraction of the distance from the doghouse end wall 24 to the downstream end of the batch blanket. A majority of the batch blanket in such a case would extend beyond the doghouse, into the main body of the furnace enclosure. Accordingly, it may also be said that the barriers extend a substantial distance into the main body of the furnace, that distance being at least as great as the horizontal depth of the fill doghouse extension.

Another structural relationship useful in defining the location of the barriers is that their downstream ends should be spaced from the inlet opening a distance greater than about half the inside width of the furnace.

The barriers are preferably spaced from the sidewalls of the furnace, closely adjacent to the sides of the batch blanket so as to maximize symmetry of the melting process by leaving little or no space for lateral movement of the batch blanket. The barriers may be generally parallel to the sidewalls of the furnace, but since the width of the batch blanket is reduced as melting progresses, the barriers may toe-in slightly to follow the outline of the blanket more closely.

As a specific example, consider a furnace of the type shown in FIGS. 1 and 2 whose size and proportions are typical of commercial flat glass manufacturing installations wherein: the furnace is about 30 feet (9 meters) wide, with seven burner ports on each side spaced 10 feet (3 meters) apart from center to center and 10 feet (3 meters) from the ends, provided with a fill doghouse that extends about 5 feet (1.5 meters) beyond the back wall. The glass depth is approximately 4 feet (1.2 meters), and the batch blanket is about 20 feet (6 meters) in width at the inlet and extends to a point between the third and fourth burners. A pair of carbon barrier rods 30 feet (9 meters) long and 9 inches (22.5 centimeters) in diameter were installed in such a furnace, using water-cooled stainless steel hold-down pipes to maintain the rods submerged about one inch (2.5 centimeters) below the molten glass surface. The rods were parallel to the sidewalls and substantially horizontal, with the upstream ends spaced about 7 inches (17.5 centimeters) from the doghouse end wall. With the barrier rods in place the need for manual pushing of the batch was eliminated, no batch drifted against the sidewalls, and furnace temperatures stabilized significantly.

It should be apparent that other modifications and variations as are known to those of skill in the art may be resorted to without departing from the spirit and scope of the invention as defined by the appended claims.

I claim:

1. In a continuous process for making molten glass of the type wherein glass batch material is introduced into a melting furnace through an inlet opening at an end wall of the furnace and molten glass is withdrawn from the furnace through an outlet opening which is spaced from said inlet opening in a longitudinal direction, whereby molten glass and batch materials within the furnace continually progress generally in the longitudinal direction along a flow path defined by an opposed pair of sidewalls in the furnace, the introduction of the batch material being such that the batch is deposited onto the surface of the molten glass within the furnace across less than the full width of the furnace so as to maintain on the molten glass a substantially continuous blanket of batch material which extends longitudinally from the inlet end to a point intermediate said inlet end and said outlet and which is initially spaced from the sidewalls of the furnace, said blanket continually progressing along the furnace in the longitudinal direction while being melted, wherein portions of said blanket have a tendency to drift laterally toward the sidewalls, the improvement comprising:

preventing the batch blanket from laterally drifting into contact with the sidewalls as it progresses longitudinally by maintaining between each sidewall and the respective side of the batch blanket a substantially horizontally and longitudinally extending barrier submerged slightly below the surface of the molten glass along at least 30 percent of the length of the batch blanket so that movement of the batch blanket in the longitudinal direction is essentially unimpeded but lateral drifting onto the sidewalls is thereby obstructed, and holding said barriers in place by means of separate support members extending into the furnace so that said barriers are retained wholly within the confines of the furnace.

2. The method of claim 1 wherein the batch material is deposited across about two-thirds of the width of the pool of molten glass and the barriers are located closely adjacent to the sides of the batch blanket so as to prevent substantial lateral drifting of the batch blanket.

3. The method of claim 1 wherein the barriers extend downstream at least as far as the downstream end of the batch blanket.

4. The method of claim 1 wherein the barriers are made of carbon, and the support members comprise water-cooled hold-down pipes extending through the furnace roof.

5. A furnace for the continuous production of molten glass comprising:

an enclosure for holding a volume of molten glass, including an inlet end wall, an outlet opening displaced from said inlet end wall in a longitudinal direction, a pair of opposed sidewalls defining a flow path for the molten glass from said inlet end wall toward said outlet opening, and an inlet opening at said inlet end wall through which glass batch material may be introduced onto the molten glass as a substantially continuous batch blanket spaced from the sidewalls and free to progress in the longitudinal direction toward said outlet opening;

a plurality of burner ports spaced longitudinally along said enclosure adapted for melting the longitudinally progressing glass batch prior to its arrival at the outlet opening;

a pair of spaced apart, substantially horizontally and longitudinally extending barriers supported wholly within said enclosure with their downstream ends located at least as far downstream as the region opposite the first of said burner ports from the inlet end, each barrier having a length at least as great as 30 percent of the distance from said inlet opening to said first burner port, said barriers supported at an elevation such that they serve as obstacles against lateral drifting of the batch blanket onto the sidewalls as it progresses longitudinally; and support members extending into said enclosure, engaging said barriers, and holding the barriers in place.

6. The furnace of claim 5 wherein said barriers are made of carbon, and said support members comprise hold-down pipes extending into the furnace from above the barriers.

7. The furnace of claim 5 wherein the length of each of said barriers is greater than half the width of said enclosure.

8. The furnace of claim 5 wherein the upstream ends of said barriers are closely adjacent to, but spaced from, the inlet end wall.

9. The furnace of claim 8 wherein said inlet end wall forms part of a doghouse extension of said enclosure, and the upstream ends of said barriers lie within said extension.

10. The furnace of claim 9 wherein said barriers extend downstream beyond the region opposite the second of said burners from the inlet end.

11. The furnace of claim 5 wherein the arrangement of said support members leaves an essentially unobstructed area for circulation of molten glass beneath said barriers.

12. A method for improving the performance of a continuous glass melting operation of the type wherein glass batch material is introduced into a melting furnace through an inlet opening at an end wall of the furnace and molten glass is withdrawn from the furnace through an outlet opening which is spaced from said inlet opening in a longitudinal direction, whereby molten glass and batch materials within the furnace continually progress generally in the longitudinal direction along a flow path defined by an opposed pair of sidewalls in the furnace, the introduction of the batch material being such that the batch is deposited onto the surface of the molten glass within the furnace across less than the full width of the furnace so as to maintain on the molten glass a substantially continuous blanket of batch material which extends longitudinally from the inlet end to a point intermediate said inlet end and said outlet and which is initially spaced from the sidewalls of the furnace, said blanket continually progressing along the furnace in the longitudinal direction while being melted, wherein portions of said blanket have a tendency to drift laterally toward the sidewalls, comprising the steps of:

while said pool of glass is maintained in the molten state, inserting through said inlet opening a pair of rods of refractory material having a specific gravity less than that of the molten glass;

aligning said rods substantially parallel to the sidewalls of the furnace while buoyantly supported by the molten glass and placing said rods in a spaced-apart and substantially co-extensive relationship to each other so as to outline the sides of a flow path for the longitudinal progression of the batch blanket spaced from the sidewalls; and into the molten glass, thereby submerging and retaining the rods beneath the surface of the molten glass at an elevation slightly below the surface of the molten glass so that movement of the batch blanket in the longitudinal direction is essentially unimpeded but lateral drifting onto the sidewalls is obstructed.

13. The method of claim 12 wherein said rods are made of carbon and said support means comprise water-cooled pipes, and said engaging step comprises inserting said pipes into said furnace, and mating the end of each pipe with a bore in one of said carbon rods.

* * * * *

UNITED STATES PATENT OFFICE
CERTIFICATE OF CORRECTION

PATENT NO. : 3,941,576
DATED : March 2, 1976
INVENTOR(S) : Wright M. Welton, Jr.

It is certified that error appears in the above–identified patent and that said Letters Patent are hereby corrected as shown below:

Column 10, line 1, before "into" please insert --engaging said rods with support means which extend--.

Signed and Sealed this first Day of June 1976

[SEAL]

Attest:

RUTH C. MASON
Attesting Officer

C. MARSHALL DANN
Commissioner of Patents and Trademarks